United States Patent
Hayakawa et al.

(10) Patent No.: US 11,059,493 B2
(45) Date of Patent: Jul. 13, 2021

(54) SYSTEMS AND METHODS FOR ESTIMATING VELOCITY OF AN AUTONOMOUS VEHICLE AND STATE INFORMATION OF A SURROUNDING VEHICLE

(71) Applicant: HONDA MOTOR CO., LTD., Tokyo (JP)

(72) Inventors: Jun Hayakawa, Sunnyvale, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/380,586

(22) Filed: Apr. 10, 2019

(65) Prior Publication Data
US 2020/0324781 A1 Oct. 15, 2020

(51) Int. Cl.
*B60W 40/105* (2012.01)
*G06T 7/246* (2017.01)

(52) U.S. Cl.
CPC .......... *B60W 40/105* (2013.01); *G06T 7/246* (2017.01); *B60W 2420/42* (2013.01); *B60W 2520/10* (2013.01); *B60W 2554/804* (2020.02); *G06T 2207/30252* (2013.01)

(58) Field of Classification Search
None
See application file for complete search history.

(56) References Cited

U.S. PATENT DOCUMENTS

| | | | |
|---|---|---|---|
| 2012/0200431 A1* | 8/2012 | Ross | G08G 1/04 340/936 |
| 2020/0189592 A1* | 6/2020 | Jang | B60W 60/0015 |
| 2020/0209858 A1* | 7/2020 | Trofymov | G05D 1/0246 |
| 2020/0219264 A1* | 7/2020 | Brunner | G01S 17/931 |

* cited by examiner

*Primary Examiner* — Vikkram Bali
(74) *Attorney, Agent, or Firm* — Arent Fox LLP

(57) ABSTRACT

Systems and methods for estimating velocity of an autonomous vehicle and state information of a surrounding vehicle are provided. In some aspects, the system includes a memory that stores instructions for executing processes for estimating velocity of an autonomous vehicle and state information of the surrounding vehicle and a processor configured to execute the instructions. In various aspects, the processes include: receiving image data from an image capturing device; performing a ground plane estimation by predicting a depth of points on a road surface based on an estimated pixel-level depth; determining a three-dimensional (3D) bounding box of the surrounding vehicle; determining the state information of the surrounding vehicle based on the ground plane estimation and the 3D bounding box; and determining the velocity of the autonomous vehicle based on an immovable object relative to the autonomous vehicle. In some aspects, an operation of the autonomous vehicle may be controlled based on at least one of the state information or the velocity of the autonomous vehicles.

17 Claims, 9 Drawing Sheets

405

SYSTEMS AND METHODS FOR ESTIMATING VELOCITY OF AN AUTONOMOUS VEHICLE AND STATE INFORMATION OF A SURROUNDING VEHICLE

TECHNICAL FIELD

This disclosure relates to methods and systems for estimating velocity of an autonomous vehicle and state information of a surrounding vehicle.

BACKGROUND

Understanding ego-motion, e.g., the velocity of an autonomous vehicle, and state information of a surrounding vehicle is essential for operating autonomous vehicles and advanced driver-assistance systems (ADAS) enabled vehicles. For example, 3D position, velocity, and orientation of surrounding vehicles are critical information for decision making and path planning for operating autonomous vehicles and advanced driver-assistance systems (ADAS) enabled vehicles. Furthermore, for autonomous vehicles to be widely accepted, these systems may be as simple as possible to ease implementation and ensure reliability while minimizing cost.

Many systems for estimating ego-motion and surrounding vehicle state may rely on, for example, LiDAR or multiple sensors, such as a combination of two or more of a LiDAR, a camera, and a radar. Other systems may rely on cameras to make a vehicle sensor system cost-effective and straightforward. However, it may be still challenging to estimate ego-motion and state information of a surrounding vehicle with information from only a monocular camera compared to information from multiple sensors. 2D object detection AI-based algorithms have achieved great performance with fast and accurate 2D object detection using a monocular camera. However, the 2D object detection results lack distance information. On the other hand, LiDAR and stereo camera are generally used in autonomous vehicle development to estimate 3D features of the vehicles. However LiDAR technology may be expensive, may not provide the long-term reliability required in automotive applications due to the existence of rotating parts. Stereo camera may also expensive, may require high precision calibration. The monocular 3D object detection may be based on regression of a 3D bounding box in a 2D image, or may be based on a fixed single ground plane, which is not constant in driving situations.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system for estimating velocity of an autonomous vehicle and state information of a surrounding vehicle. The system may include a memory that stores instructions for executing processes for estimating the velocity of the autonomous vehicle and state information of the surrounding vehicle and a processor configured to execute the instructions. The processes may include: receiving image data from an image capturing device; performing a ground plane estimation by predicting a depth of points on a road surface based on an estimated pixel-level depth; determining a three-dimensional (3D) bounding box of the surrounding vehicle; determining the state information of the surrounding vehicle based on the ground plane estimation and the 3D bounding box; and determining the velocity of the autonomous vehicle based on an immovable object relative to the autonomous vehicle. In some aspects, an operation of the autonomous vehicle may be controlled based on at least one of the state information or the velocity of the autonomous vehicles.

In another aspect, the present disclosure is related to a method for estimating velocity of an autonomous vehicle and state information of a surrounding vehicle. The method may include: receiving image data from an image capturing device; performing a ground plane estimation by predicting a depth of points on a road surface based on an estimated pixel-level depth; determining a three-dimensional (3D) bounding box of the surrounding vehicle; determining the state information of the surrounding vehicle based on the ground plane estimation and the 3D bounding box; and determining the velocity of the autonomous vehicle based on an immovable object relative to the autonomous vehicle. In some aspects, an operation of the autonomous vehicle may be controlled based on at least one of the state information or the velocity of the autonomous vehicles.

In a further aspects, the present disclosure is related to a non-transitory computer-readable storage medium containing executable computer program code for estimating velocity of an autonomous vehicle and state information of a surrounding vehicle. The code may comprise instructions configured to cause a processor to: receive image data from an image capturing device; perform a ground plane estimation by predicting a depth of points on a road surface based on an estimated pixel-level depth; determine a three-dimensional (3D) bounding box of the surrounding vehicle; determine the state information of the surrounding vehicle based on the ground plane estimation and the 3D bounding box; and determine the velocity of the autonomous vehicle based on an immovable object relative to the autonomous vehicle. In some aspects, an operation of the autonomous vehicle may be controlled based on at least one of the state information or the velocity of the autonomous vehicles.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), Automotive Ethernet, among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), Graphic Dynamic RAM (GDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides systems and methods for estimating velocity of an autonomous vehicle and state information of a surrounding vehicle. For example, in some implementations, the present disclosure provides systems and methods for estimating velocity of an autonomous vehicle and state information of a surrounding vehicle by combining 3D bounding box detection, depth estimation, ground plane estimation, and flow estimation.

Figure 1:
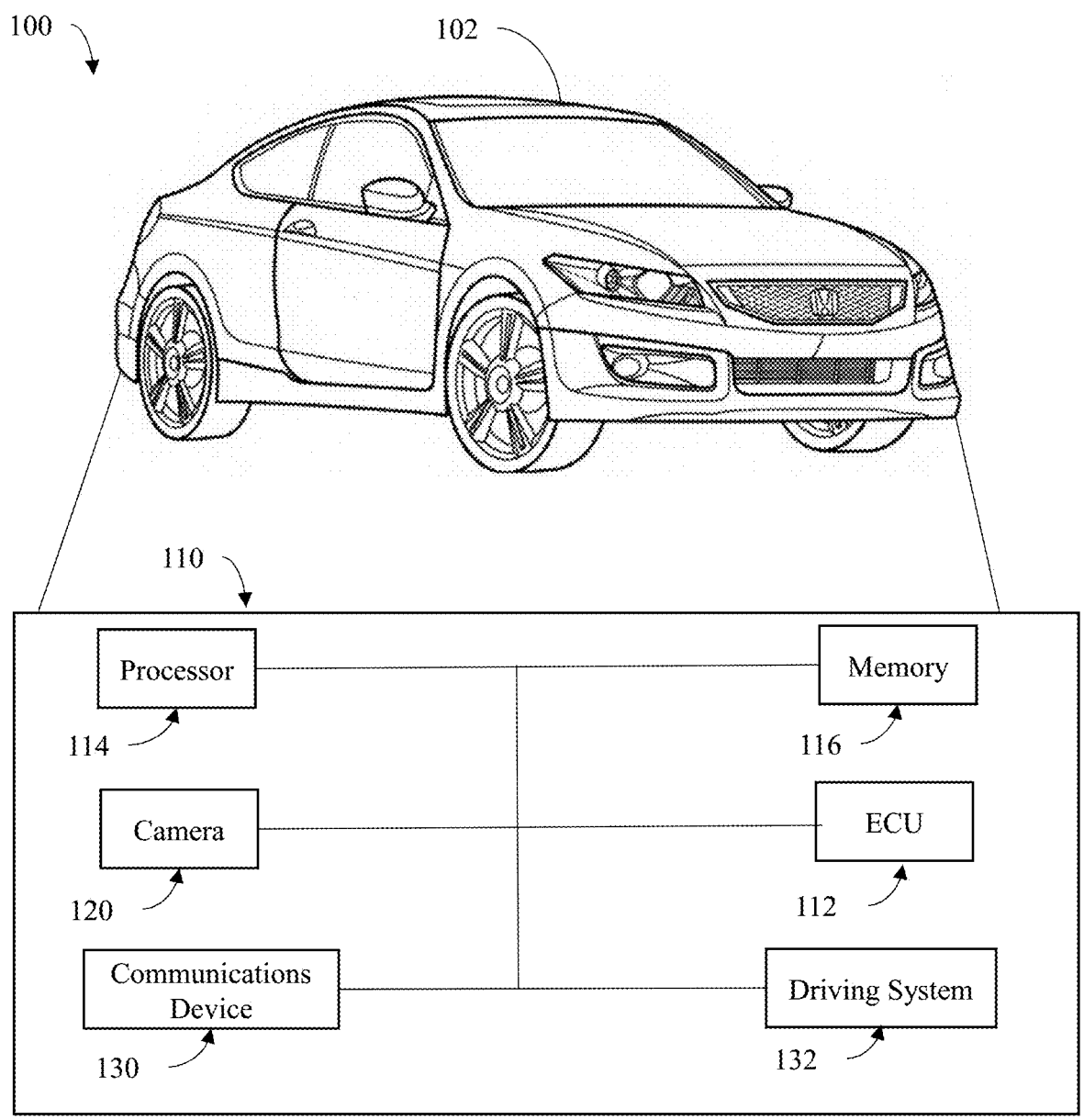
FIG. 1 illustrates a schematic view of an exemplary operating environment of a data acquisition system in accordance with aspects of the present disclosure.

Turning to FIG. 1, a schematic view of an example operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may include a front camera or other image-capturing device (e.g., a scanner) 120, roof camera or other image-capturing device (e.g., a scanner) 121, and rear camera or other image capturing device (e.g., a scanner) 122 that may also be connected to the ECU 112 to provide images of the environment surrounding the vehicle 102. The vehicle system 110 may also include a processor 114 and a memory 116 that communicate with the front camera 120, roof camera 121, rear camera 122, communications device 130, and driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus or/and Automotive Ethernet) to facilitate data input and output between the electronic control unit 112 and vehicle features and systems. In an aspect, the communications device 130 may be configured for vehicle-to-everything (V2X) communications. For example, V2X communications may include wireless communications over a reserved frequency spectrum. As another example, V2X communications may include an ad hoc network between vehicles set up using Wi-Fi or Bluetooth®.

Figure 3:
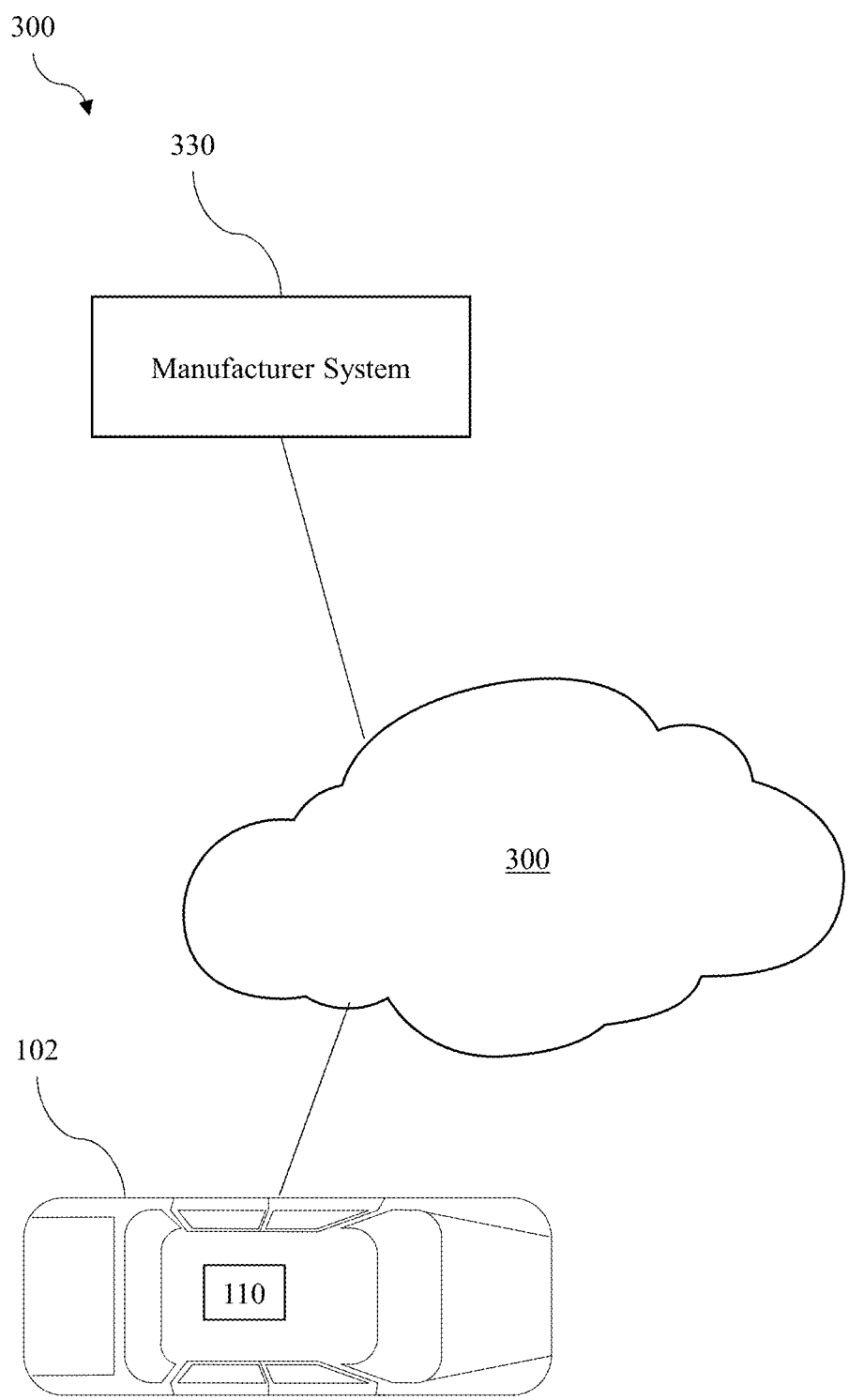
FIG. 3 illustrates an exemplary network for managing the data acquisition system, according to aspects of the present disclosure.

The vehicle 102 may include a camera 120, such as a monocular camera. For example, the camera 120 may be a digital camera capable of capturing one or more images or image streams that may be provided to a driving system 132 or a remote server, such as a manufacturer system, as discussed with respect to FIG. 3. The driving system 132 may also include a memory that stores instructions for executing processes for estimating velocity of an autonomous vehicle and state information of a surrounding vehicle, and a processor configured to execute the instructions.

Figure 2:
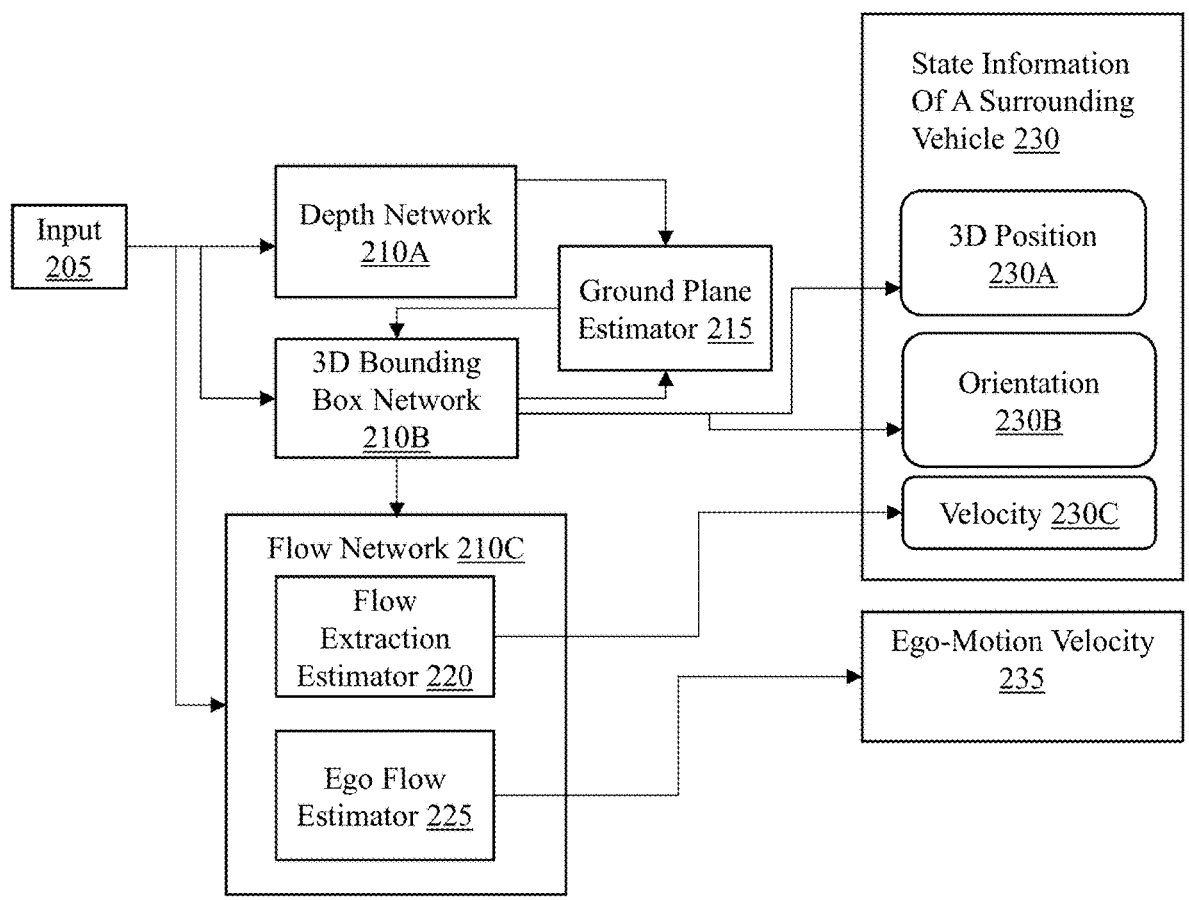
FIG. 2 illustrates a schematic view of an exemplary operating environment of a vehicle system in accordance with aspects of the present disclosure.

According to aspects of the present disclosure, as illustrated in FIG. 2, the driving system 132 may be configured to receive an input 205, such as images or a data stream from the camera 120, and to execute a plurality of neural networks, namely a depth network 210A, a 3D bounding box network 210B, and a flow network 210C. In some implementations, the depth network 210A, the 3D bounding box network 210B, and the flow network 210C may be used to generate a plurality of outputs, namely state information of a surrounding vehicle 230 and ego-motion 235. The state information of a surrounding vehicle 230 may include a 3D position 230A of a surrounding vehicle, an orientation 230B of the surrounding vehicle, and a velocity 230C of the surrounding vehicle.

In some implementations, the depth network 210A may be configured to generate pixel-level depth of a road surface traversed by the vehicle 102. For example, in some implementations, the depth network 210A may be a deep-learning model pre-trained on a KITTI dataset, as should be understood by those of ordinary skill in the arts. As such, the depth network 210A may be configured to perform a ground plane estimation predicting a depth of points on the road surface based on the estimated pixel-level depth. In some implementations, the depth network 210A may implement unsupervised learning, and therefore, the depth network 210A may not take into consideration factors such as variations of ground truth annotations, thereby eliminating costs associated with the annotating images. The depth network 210A may be configured to provide the depth information of the points on the road surface to a ground plane estimator 215.

According to aspects of the present disclosure, the 3D bounding box network 210B may be configured to determine a 3D bounding box of another vehicle surrounding the vehicle 102 (interchangeably referred to herein as a "surrounding vehicle") using a machine learning algorithm. In some implementations, the machine learning algorithm may be generated using a fully convolutional network (FCN) framework and a multi-scale network based on a Single Shot MultiBox Detector (SSD) and a multi-scale convolutional neural network (MS-CNN) and Dense Convolutional Network (DenseNet). Using these machine learning algorithms, the 3D bounding box network 210B may implement a 3D bounding box representation, which is independent of an image projection matrix. Using the 3D bounding box, the 3D bounding box network 210B may be configured to generate the 3D Position 230A of surrounding vehicles in a 2D image. For example, the 3D Position 230A may be coordinates of three bottom vertices and a height of a bounding box of the surrounding vehicle. According to some aspects of the present disclosure, each bottom vertex coordinate $[u\ v]^T$ may be reconstructed in the 3D world using a projection matrices (1) and (2) and a ground plane equation (3).

$$P = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \quad (1)$$

$$\begin{bmatrix} x \\ y \\ z \\ 1 \end{bmatrix} = P^{-1} \begin{bmatrix} u \\ v \\ 1 \end{bmatrix} \quad (2)$$

$$ax + by + cz + d = 0 \quad (3)$$

where f is a focal length, c is a camera center, r is a rotation factor, and t is a translation factor. That is, the 3D bounding box network 210B may be configured to generate 3D coordinates for the top vertices of the bounding box of detected vehicles using a height output and estimate the 3D bounding box.

According to further aspects of the present disclosure, the ground plane estimator 215 may receive the depth information of the points on the road surface and the 3D bounding box from the depth network 210A and the 3D bounding box network 210B, respectively, and may be configured to perform a ground plane correction using this information. For example, while the vehicle 102 is moving, ground plane coefficients may be continuously changing depending on the inclination of the road surface, as well as pitching, rolling, and yaw angle of the vehicle 102. To account for the changes in the ground plane coefficients, the ground plane estimator 215 may be configured to update the ground plane coefficients by measuring an actual inclination of the ground surface in real-time. To achieve this, the ground plane estimator 215 may be configured to determine ground plane coefficients using a RANSAC (Random Sample Consensus) algorithm for fitting to optimal coefficients (a, b, c, d) in equation (3) using the bottom four corners vertices of the 3D bounding box. As such, the ground plane coefficients may be refined to fit to the road surface in real-time, and in order to solve this problem, the ground plane estimator 215 may be configured to use the depth information from the depth network 210A. In some implementations, the depth information from the depth network 210A may be a normalized depth and the ground plane estimator 215 may be configured to convert the normalized depth to an actual distance. For example, the ground plane estimator 215 may convert the normalized depth into an actual distance based on the known distance beforehand, as illustrated in equation (4).

$$\text{Dist} = k \times \text{Depth} \quad (4)$$

where k is the coefficient between the normalized depth (Depth) and actual distance (Dist).

Figure 7A:
FIGS. 7A and 7B illustrate an exemplary ground plane correction results, according to aspects of the present disclosure.
Figure 7B:

In further implementations, the ground plane estimator 215 may be configured to select a plurality of fixed points in a lower portion of the image of the input 205 that includes the road surface. After that, the ground plane estimator 215 may be configured to remove one or more points of the plurality of fixed points that are inappropriate for estimating the ground plane. To determine which points are inappropriate, the ground plane estimator 215 may determine which points are outside of the 3D bounding box for every frame. Using the information from the depth network 210A, the ground plane estimator 215 may be configured to project the remaining points into a 3D world coordinate system and to execute the RANSAC algorithm to estimate the corrected ground plane coefficients. To update the ground plane, the ground plane estimator 215 may be configured to determine whether the update is possible by comparing the initial ground plane coefficients, ground plane coefficients in a previous frame, and currently estimated ground plane coefficients based on equation (5). When the update is determined to be possible, the ground plane estimator 215 may be configured to compute new coefficients of the ground plane based on equation (6).

$$\begin{cases} \|n_t - n_{init}\| < \theta_0, \\ \|n_t - n_{t-1}\| < \theta_1, \\ |d_t - d_{init}|/d_{init} < \theta_2 \end{cases} \quad (5)$$

$$a_{new}x + b_{new}y + c_{new}z + d_{new} = 0 \quad (6)$$

where $n_t$ is the normal vector and $d_t$ is the d coefficient of the ground plane for $t^{th}$ frame, $n_{init}$ and $d_{init}$ are the normal vector and $d_{init}$ coefficient of the primary ground plane, $\theta$ is a threshold for judging whether to update the ground plane or not. The term $\theta$ may be decided to ignore rapid changes by measurement noise, and may be decided by experimental way or scene. If $\theta$ is above a certain threshold value, the measurement noise may not be effectively removed. If $\theta$ is below another threshold value, the ground plane may be adjusted on small slope changes of the road. The threshold values may be empirically and/or experimentally determined. FIGS. 7A and 7B illustrate example ground plane correction results. Namely, as illustrated in FIGS. 7A and 7B, the plurality of points are illustrated as red and yellow dots on the road surface, with the yellow dots being one or more points that are inappropriate for estimating the road surface. Furthermore, the blue line represents the corrected ground plane and the red line represents the initial ground plane.

In some implementations, the 3D bounding box network 210B may be further configured to determine the orientation 230B of the surrounding vehicle in the 3D world coordinate system. For example, the orientation 230B may be calculated by projecting the predicted 3D bounding box from the 3D bounding box network 210B into the corrected ground plane from the ground plane estimator 215 using the depth estimation from the depth network 210A.

In accordance with aspects of the present disclosure, the flow network 210C may be configured to assess the surroundings of the vehicle 102. For example, the flow network 210C may be configured to determine an absolute velocity of the vehicle 102 and the relative velocity of the surrounding vehicle, and using this information, the flow network 210C may then calculate the absolute velocity of the surrounding vehicle. In some aspects, the flow network 210C may be a model pre-trained using the KITTI dataset, as should be understood by those ordinary skill in the arts.

Figure 4:
FIG. 4 illustrates an exemplary road surface having an area used for determining a velocity of a vehicle, according to aspects of the present disclosure.

The flow network 210C may include an ego flow estimator 225 for determining the velocity, such as an absolute velocity, of the vehicle 102. For example, the ego flow estimator 225 may be configured to determine the absolute velocity of the vehicle 102 based on the flow of immovable objects, such as the ground. For example, in order to estimate the velocity of the vehicle 102, the ego flow estimator 225 may be configured to assume that a road surface as close as possible to the vehicle 102 is a fixed calculation area 405, as illustrated in FIG. 4. The ego flow estimator 225 may be configured to determine a 2D flow vector (u, v) in this fixed calculation area 405 and to extract the 2D flow into a 3D flow (flow$_{Gx}$, flow$_{Gy}$, flow$_{Gz}$) using the projection matrix (1), (2) and the ground plane (3) received from the 3D bounding box network 210B. Using this information, the ego flow estimator 225 may be configured to compute a ground speed $V_G$ at the fixed calculation area 405 using (7).

$$V_G(V_{Gx}, V_{Gy}, V_{Gz}) = \frac{1}{n}\sum_{i=1}^{n} flow_G^i(x, y, z) \tag{7}$$

where $V_{Gz}$ is the longitudinal ego velocity, $V_{Gx}$ is the lateral velocity on the fixed area, and n is the total pixels in the fixed calculation area. That is, the flow network 210C may be configured to determine the ego-motion velocity 235 of the vehicle 102.

Figure 5:
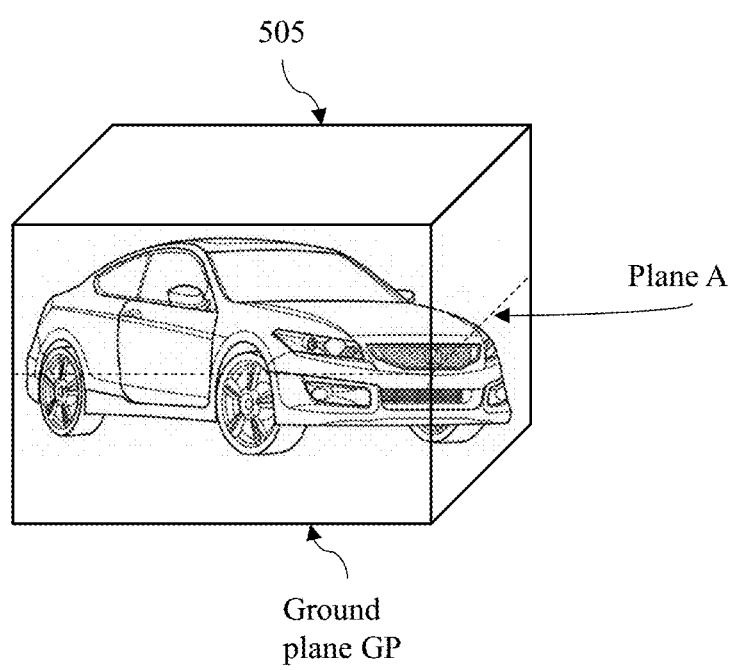
FIG. 5 illustrates an exemplary bounding box, according to aspects of the present disclosure.

The flow network 210C may also include a flow extraction estimator 220 for determining the velocity of the surrounding vehicle. For example, using the 3D position of the surrounding vehicle, the flow extraction estimator 220 may be configured to calculate a relative velocity of the surrounding vehicle using the differential of position of the vehicle 102 and the surrounding vehicle. The flow extraction estimator 220 may calculate the absolute velocity of surrounding vehicle using the relative velocity of the surrounding vehicle and the absolute velocity of the ego-vehicle calculated by the ego flow estimator 225. To achieve this, the flow extraction estimator 220 may be configured to project the 2D flow of the surrounding vehicle to the 3D coordinate of the surrounding vehicle, rather than the ground plane of the vehicle. As discussed above, the 3D bounding box network 210B may be configured to estimate the 3D bounding box of the surrounding vehicle with the 3D coordinates of each vertex. In some implementations, the flow extraction estimator 220 may convert an arbitrary 2D point on the 3D bounding box 505 into a 3D position and generate a new plane A passing through the arbitrary point and parallel to the ground plane GP, as illustrated in FIG. 5. Additionally, the flow extraction estimator 220 may be configured to convert the 2D flow into 3D flow based on the plane A corresponding to the surrounding vehicle. For example, 2D flow at an arbitrary point may be projected on the plane A rather than the ground plane GP.

In some aspects of the present disclosure, the flow extraction estimator 220 may be configured to account for different shapes of vehicles. To achieve this, the flow extraction estimator 220 may be configured to calculate the 2D flow in a lower half of the 3D bounding box 505. Moreover, the flow extraction estimator 220 may use two vertical planes of the 3D bounding box 505 near the vehicle 102 for 2D flow extraction as the two vertical planes may be visible from the vehicle 102 when there are no occlusions caused by other obstacles. In still further aspects, a 2D flow vector (u, v) in the 3D bounding box 505 may be projected on each plane based on the 2D coordinates, and then the flow extraction estimator 220 may compute the 3D flow (flow$_{Sx}$, flow$_{Sy}$, flow$_{Sz}$) and the relative velocity of the surrounding vehicle using equation (8).

$$V_{r\_s}(V_{r\_Sx}, V_{r\_Sy}, V_{r\_Sz}) = \frac{1}{m}\sum_{i=1}^{m} flow_s^j(x, y, z) \tag{8}$$

where m is total pixel number in the lower half of the 3D bounding box. The flow extraction estimator 220 may be configured to convert the relative velocity to an absolute velocity. For example, in some implementations, flow extraction estimator 220 may calculate an absolute longitudinal velocity $V_{a\_sz}$ of the surrounding vehicle by subtracting the relative velocity of the surrounding vehicle $V_{r\_sz}$ from the velocity $V_{Gz}$ of the vehicle 102 based on equation 9:

$$V_{a\_Sz} = V_{r\_Sz} + V'_{Gz} \tag{9}$$

Figure 6:
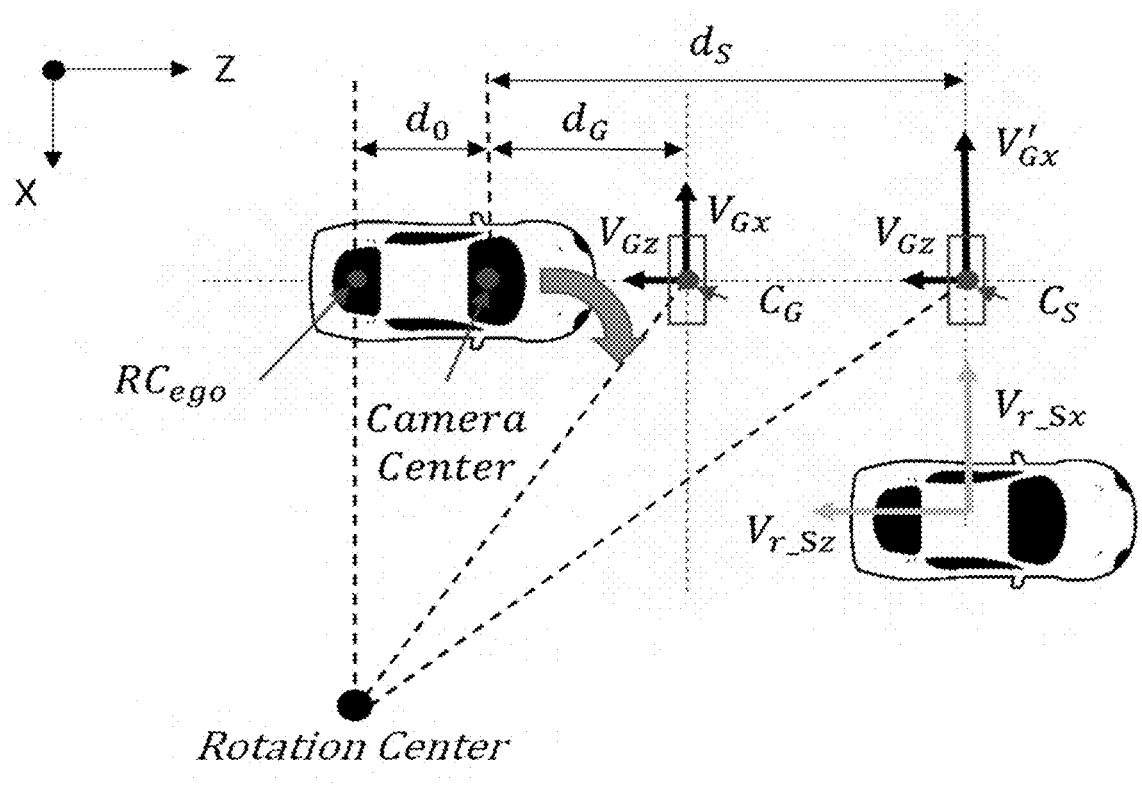
FIG. 6 illustrates an exemplary geometry diagram, according to aspects of the present disclosure.

Additionally, for the absolute lateral velocity, the flow extraction estimator 220 may be configured to recalculate a second lateral velocity $V_{Gx}'$ of the vehicle 102 near the surrounding vehicle from the based on calculated the lateral and longitudinal velocities $V_{Gx}, V_{Gz}$ of the vehicle 102. As illustrated in FIG. 6, a distance $d_0$ between $RC_{ego}$ (e.g., a location on the vehicle 102) and the camera center, e.g., a center of camera 120) is constant for a given type of vehicle. As further illustrated in FIG. 6, a distance $d_G$ between the camera center and the center $C_G$ of the fixed ground plane, and the distance $d_S$ between the camera center and the center $C_S$ of the ground near the surrounding vehicle can be predicted using, for example, the ground plane estimator 215 and/or the depth network 210A, as described herein. Using this information, the second lateral velocity $V_{Gx}'$ near the surrounding vehicle may be calculated based on equation (10):

$$V_{Gx}' = \frac{(d_0 + d_s) \times V_{Gx}}{(d_0 + d_G)} \quad (10)$$

Using the second lateral velocity $V'_{Gx}$, the flow extraction estimator 220 may be then calculate the absolute lateral velocity $V_{a\_sx}$ of the surrounding vehicle based on equation (11):

$$V_{a\_Sx} = V_{r\_Sx} + _{Gx} \quad (11).$$

That is, the flow extraction estimator 220 may calculate the absolute longitudinal velocity $V_{a\_sz}$ and the absolute lateral velocity $V_{a\_sx}$ of the surrounding vehicle, which may be output as the velocity 230c.

Figure 8:
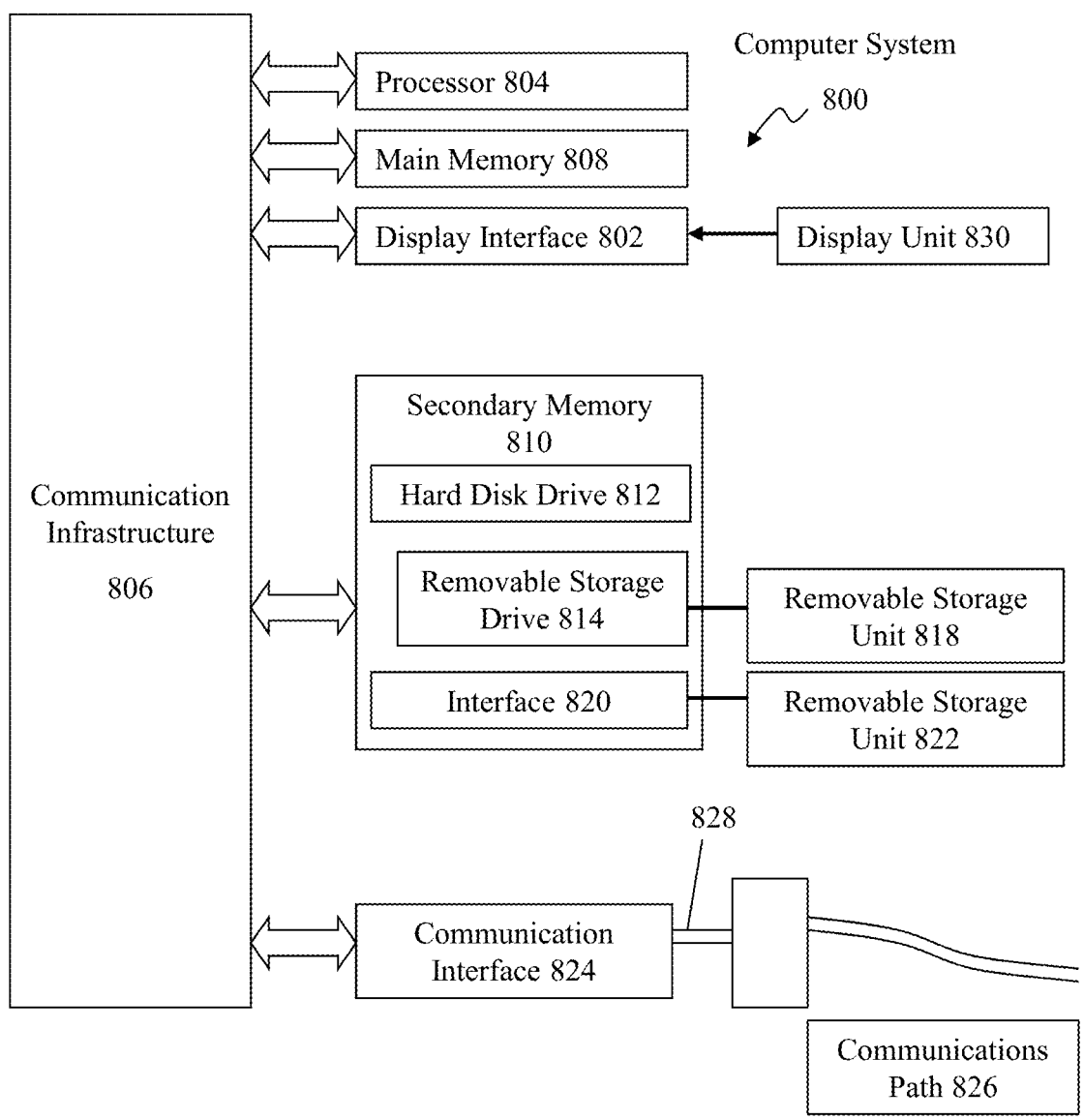
FIG. 8 illustrates various features of an exemplary computer system for use in conjunction with aspects of the present disclosure.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 800 is shown in FIG. 8.

Computer system 800 includes one or more processors, such as processor 804. The processor 804 is connected to a communication infrastructure 806 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 800 may include a display interface 802 that forwards graphics, text, and other data from the communication infrastructure 806 (or from a frame buffer not shown) for display on a display unit 830. Computer system 800 also includes a main memory 808, preferably random access memory (RAM), and may also include a secondary memory 810. The secondary memory 810 may include, for example, a hard disk drive 812, and/or a removable storage drive 814, representing a floppy disk drive, a magnetic tape drive, an optical disk drive, a universal serial bus (USB) flash drive, etc. The removable storage drive 814 reads from and/or writes to a removable storage unit 818 in a well-known manner. Removable storage unit 818 represents a floppy disk, magnetic tape, optical disk, USB flash drive etc., which is read by and written to removable storage drive 814. As will be appreciated, the removable storage unit 818 includes a computer usable storage medium having stored therein computer software and/or data.

Alternative aspects of the present invention may include secondary memory 810 and may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828, which may be electronic, electromagnetic, optical or other signals capable of being received by communications interface 824. These signals 828 are provided to communications interface 824 via a communications path (e.g., channel) 826. This path 826 carries signals 828 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 818, a hard disk installed in hard disk drive 812, and signals 828. These computer program products provide software to the computer system 800. Aspects of the present invention are directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features in accordance with aspects of the present invention, as discussed herein. In particular, the computer programs, when executed, enable the processor 804 to perform the features in accordance with aspects of the present invention. Accordingly, such computer programs represent controllers of the computer system 800.

In an aspect of the present invention where the invention is implemented using software, the software may be stored in a computer program product and loaded into computer system 800 using removable storage drive 814, hard drive 812, or communications interface 820. The control logic (software), when executed by the processor 804, causes the processor 804 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

Figure 9:
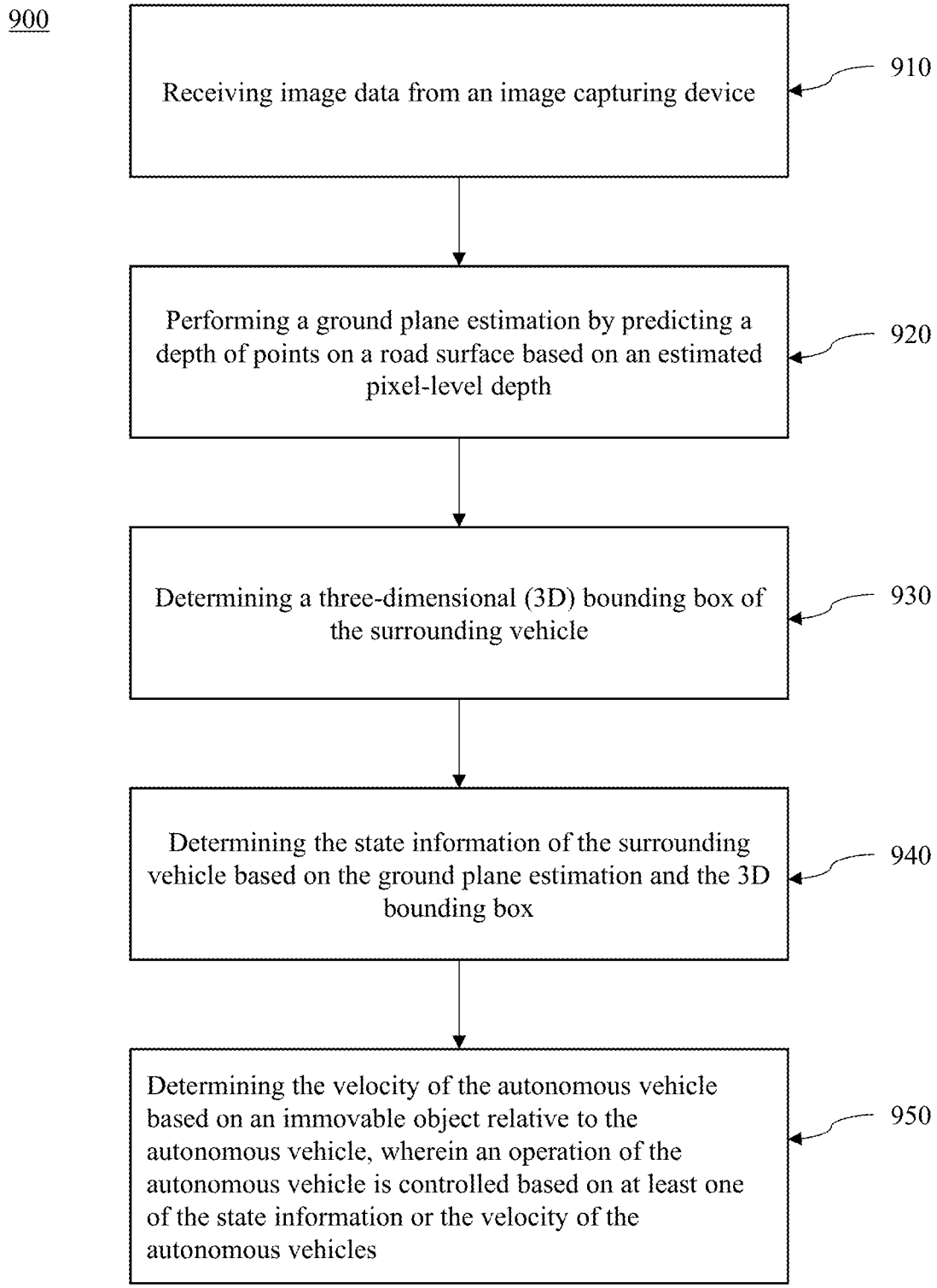
FIG. 9 illustrates an exemplary flowchart method for estimating velocity of an autonomous vehicle and state information of a surrounding vehicle, according to aspects of the present disclosure.

FIG. 9 illustrates a flowchart method for estimating a velocity of an autonomous vehicle and state information of a surrounding vehicle. The method 900 includes receiving image data from an image capturing device 910. For example, the image data may be received from the camera 120 of the vehicle 102. The method 900 also includes performing a ground plane estimation by predicting a depth of points on a road surface based on an estimated pixel-level depth 920. For example, in some implementations, the depth network 210A may be configured to generate pixel-level depth of a road surface traversed by the vehicle 102. The depth network 210A may be further configured to perform a ground plane estimation predicting a depth of points on the road surface based on the estimated pixel-level depth. In some implementations, the depth network 210A may implement unsupervised learning, and therefore, the depth network 210A may not take into consideration factors such as variations of ground truth annotations, thereby eliminating costs associated with the annotating images. The depth network 210A may be configured to provide the depth information of the points on the road surface to a ground plane estimator 215.

The method 900 also includes determining a three-dimensional (3D) bounding box of the surrounding vehicle 930. For example, the 3D bounding box network 210B may be configured to determine a 3D bounding box of another vehicle surrounding the vehicle 102 using a machine learning algorithm. In some implementations, the machine learning algorithm may be generated using a fully convolutional network (FCN) framework and a multi-scale network based on a Single Shot MultiBox Detector (SSD) and a multi-scale convolutional neural network (MS-CNN) and Dense Convolutional Network (DenseNet). Using these machine learning algorithms, the 3D bounding box network 210B may implement a 3D bounding box representation, which is independent of an image projection matrix.

The method 900 further includes determining the state information of the surrounding vehicle based on the ground plane estimation and the 3D bounding box 940. The state information of a surrounding vehicle 230 may include a 3D position 230A of a surrounding vehicle, an orientation 230B of the surrounding vehicle, and a velocity 230C of the surrounding vehicle. Using the 3D bounding box, the 3D bounding box network 210B may be configured to generate the 3D Position 230A of surrounding vehicles in the 3D world coordinate system using the corrected ground plane from the ground plane estimator 215 using the depth estimation from the depth network 210A. For example, the 3D Position 230A may be coordinates of three bottom vertices and a height of a bounding box of the surrounding vehicle. According to some aspects of the present disclosure, each bottom vertex coordinate [u v]T may be reconstructed in the 3D world using a projection matrices (1) and (2) and a ground plane equation (3) shown above.

According to further aspects of the present disclosure, the ground plane estimator 215 may receive the depth information of the points on the road surface and the 3D bounding box from the depth network 210A and the 3D bounding box network 210B, respectively, and may be configured to perform a ground plane correction using this information. For example, while the vehicle 102 is moving, ground plane coefficients may be continuously changing depending on the inclination of the road surface, as well as pitching, rolling, and yaw angle of the vehicle 102. To account for the changes in the ground plane coefficients, the ground plane estimator 215 may be configured to update the ground plane coefficients by measuring an actual inclination of the ground surface in real-time. To achieve this, the ground plane estimator 215 may be configured to determine ground plane coefficients using a RANSAC (Random Sample Consensus) algorithm for fitting to optimal coefficients (a, b, c, d) in equation (3) using the bottom four corners vertices of the 3D bounding box. As such, the ground plane coefficients may be refined to fit to the road surface in real-time, and in order to solve this problem, the ground plane estimator 215 may be configured to use the depth information from the depth network 210A. In some implementations, the depth information from the depth network 210A may be a normalized depth and the ground plane estimator 215 may be configured to convert the normalized depth to an actual distance. For example, the ground plane estimator 215 may convert the normalized depth into an actual distance based on the known distance beforehand, as illustrated in equation (4), shown above.

In further implementations, the ground plane estimator 215 may be configured to select a plurality of fixed points in a lower portion of the image of the input 205 that includes the road surface. After that, the ground plane estimator 215 may be configured to remove one or more points of the plurality of fixed points that are inappropriate for estimating the ground plane. To determine which points are inappropriate, the ground plane estimator 215 may determine which points are outside of the 3D bounding box for every frame. Using the information from the depth network 210A, the ground plane estimator 215 may be configured to project the remaining points into a 3D world coordinate system and to execute the RANSAC algorithm to estimate the corrected ground plane coefficients. To update the ground plane, the ground plane estimator 215 may be configured to determine whether the update is possible by comparing the initial ground plane coefficients, ground plane coefficients in a previous frame, and currently estimated ground plane coefficients based on equation (5). When the update is determined to be possible, the ground plane estimator 215 may be configured to compute new coefficients of the ground plane based on equation (6) shown above. The term $\theta$ may be decided to ignore rapid changes by measurement noise, and may be decided by experimental way or scene. If $\theta$ is above a certain threshold value, the measurement noise may not be effectively removed. If $\theta$ is below another threshold value, the ground plane may be adjusted on small slope changes of the road. The threshold values may be empirically and/or experimentally determined.

In some aspects, there may be an assumption that the three bottom vertices is on the ground plane from the ground plane estimator 215 result. In some implementations, the 3D bounding box network 210B may be further configured to determine the orientation 230B of the surrounding vehicle in the 3D world coordinate system. For example, the orientation 230B may be calculated by projecting the predicted 3D bounding box from the 3D bounding box network 210B into the corrected ground plane from the ground plane estimator 215 using the depth estimation from the depth network 210A. In some implementations, the flow network 210C may determine the absolute velocity 230C of the surrounding vehicle based on a difference between the absolute velocity of the autonomous vehicle and a relative velocity of the surrounding vehicle.

The method also includes determining the velocity of the autonomous vehicle based on an immovable object relative to the autonomous vehicle 950. For example, the ego flow estimator 225 may be configured to determine the absolute velocity of the vehicle 102 based on the flow of immovable objects, such as the ground. For example, in order to estimate the velocity of the vehicle 102, the ego flow estimator 225 may be configured to assume that a road surface as close as possible to the vehicle 102 is a fixed calculation area 405, as illustrated in FIG. 4. The ego flow estimator 225 may be configured to determine a 2D flow vector (u, v) in this fixed calculation area 405 and to extract the 2D flow into a 3D flow (flow$_{Gx}$, flow$_{Gy}$, flow$_{Gz}$) using the projection matrix (1), (2) and the ground plane (3) received from the 3D bounding box network 210B. Using this information, the ego flow estimator 225 may be configured to compute a ground speed $V_G$ at the fixed calculation area 405 using (7) shown above. In some aspects, an operation of the autonomous vehicle may be controlled based on at least one of the state information or the velocity of the autonomous vehicles.

The method includes determining the relative velocity of the surrounding vehicle based on the flow extraction estimator 220. For example, the flow extraction estimator 220 may be configured to determine the relative velocity of surrounding vehicle based on projecting the flow into the plane of the detected 3D bonding box. The flow extraction estimator 220 may calculate the absolute velocity of surrounding vehicle using the relative velocity of the surrounding vehicle and the absolute velocity of the ego-vehicle calculated by the ego flow estimator 225. To achieve this, the flow extraction estimator 220 may be configured to project the 2D flow of the surrounding vehicle to the 3D coordinate of the surrounding vehicle, rather than the ground plane of the vehicle. As discussed above, the 3D bounding box network 210B may be configured to estimate the 3D bounding box of the surrounding vehicle with the 3D coordinates of each vertex. In some implementations, the flow extraction estimator 220 may convert an arbitrary 2D point on the 3D bounding box 505 into a 3D position and generate a new plane A passing through the arbitrary point and parallel to the ground plane GP, as illustrated in FIG. 5. Additionally, the flow extraction estimator 220 may be configured to convert the 2D flow into 3D flow based on the plane A corresponding to the surrounding vehicle. For example, the 2D flow at an arbitrary point may be projected on the plane A rather than the ground plane GP.

In some aspects of the present disclosure, the flow extraction estimator 220 may be configured to account for different shapes of vehicles. To achieve this, the flow extraction estimator 220 may be configured to calculate the 2D flow in a lower half of the 3D bounding box 505. Moreover, the flow extraction estimator 220 may use two vertical planes of the 3D bounding box 505 near the vehicle 102 for 2D flow extraction as the two vertical planes may be visible from the vehicle 102 when there are no occlusions caused by other obstacles. In still further aspects, a 2D flow vector (u, v) in the 3D bounding box 505 may be projected on each plane based on the 2D coordinates, and then the flow extraction estimator 220 may compute the 3D flow (flow$_{Sx}$, flow$_{Sy}$, flow$_{Sz}$) and the relative velocity of the surrounding vehicle using equation (8) shown above.

In some examples, the flow extraction estimator 220 may be configured to convert the relative velocity to an absolute velocity. For example, in some implementations, flow extraction estimator 220 may calculate an absolute longitudinal velocity $V_{a\_sz}$ of the surrounding vehicle by subtracting the relative velocity of the surrounding vehicle $V_{r\_sz}$ from the velocity $V_{Gz}$ of the vehicle 102 based on equation 9 shown above.

In certain implementations, for the absolute lateral velocity, the flow extraction estimator 220 may be configured to recalculate a second lateral velocity $V'_{Gx}$ of the vehicle 102 near the surrounding vehicle from the based on calculated the lateral and longitudinal velocities $V_{Gz}, V_{Gz}$ of the vehicle 102. As illustrated in FIG. 6, a distance $d_0$ between $RC_{ego}$ (e.g., a location on the vehicle 102) and the camera center, e.g., a center of camera 120) is constant for a given type of vehicle. As further illustrated in FIG. 6, a distance $d_G$ between the camera center and the center $C_G$ of the fixed ground plane, and the distance $d_S$ between the camera center and the center $C_S$ of the ground near the surrounding vehicle can be predicted using, for example, the ground plane estimator 215 and/or the depth network 210A, as described herein. Using this information, the second lateral velocity $V'_{Gx}$ near the surrounding vehicle may be calculated based on equation (10) shown above.

Using the second lateral velocity $V'_{Gx}$, the flow extraction estimator 220 may be then calculate the absolute lateral velocity $V_{a\_sx}$ of the surrounding vehicle based on equation (11) shown above. That is, the flow extraction estimator 220 may calculate the absolute longitudinal velocity $V_{a\_sz}$ and the absolute lateral velocity $V_{a\_sx}$ of the surrounding vehicle, which may be output as the velocity 230c.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An automated driving (AD) system for estimating velocity of an autonomous vehicle and state information of a surrounding vehicle, the system comprising:
    a memory that stores instructions for executing processes estimating the velocity of the autonomous vehicle and state information of the surrounding vehicle; and
    a processor configured to execute the instructions, wherein the processes comprise:
        receiving image data from an image capturing device;
        performing a ground plane estimation by predicting a depth of points on a road surface based on an estimated pixel-level depth;
        determining a three-dimensional (3D) bounding box of the surrounding vehicle;
        determining the state information of the surrounding vehicle based on the ground plane estimation and the 3D bounding box; and
        determining the velocity of the autonomous vehicle based on an immovable object relative to the autonomous vehicle, wherein an operation of the autonomous vehicle is controlled based on at least one of the state information or the velocity of the autonomous vehicles,
    wherein performing the ground plane estimation comprises updating one or more ground plane coefficients based on changes in the road surface in real-time,
    wherein updating one or more ground plane coefficients comprises:
    selecting a plurality of fixed points in a lower portion of the image data that includes the road surface;
    removing one or more points of the plurality of fixed points that are inappropriate for estimating the ground plane based on which points are outside of the 3D bounding box; and
    calculating new ground plane coefficients based on remaining ones of the plurality of fixed points, and the processor is further configured to generate a corrected ground plane estimation based on the new ground plane coefficients.

2. The system of claim 1, wherein the image capturing device comprises a monocular camera.

3. The system of claim 1, wherein the state information of the surrounding vehicle comprises a 3D position of the surrounding vehicle, an orientation of the surrounding vehicle, and a velocity of the surrounding vehicle.

4. The system of claim 3, wherein the 3D position of the surrounding vehicle comprises coordinates of three bottom vertices and a height of the bounding box of the surrounding vehicle.

5. The system of claim 3, wherein determining the orientation of the surrounding vehicle is based at least on the corrected ground plane estimation.

6. The system of claim 3, wherein the velocity of the surrounding vehicle comprises an absolute velocity that is based on a difference between the velocity of the autonomous vehicle and a relative velocity of the surrounding vehicle.

7. A method for estimating velocity of an autonomous vehicle and state information of a surrounding vehicle, the method comprising:
receiving image data from an image capturing device;
performing a ground plane estimation by predicting a depth of points on a road surface based on an estimated pixel-level depth;
determining a three-dimensional (3D) bounding box of the surrounding vehicle;
determining the state information of the surrounding vehicle based on the ground plane estimation and the 3D bounding box; and
determining the velocity of the autonomous vehicle based on an immovable object relative to the autonomous vehicle, wherein an operation of the autonomous vehicle is controlled based on at least one of the state information or the velocity of the autonomous vehicles,
wherein performing the ground plane estimation comprises updating one or more ground plane coefficients based on changes in the road surface in real-time,
wherein updating one or more ground plane coefficients comprises:
selecting a plurality of fixed points in a lower portion of the image data that includes the road surface;
removing one or more points of the plurality of fixed points that are inappropriate for estimating the ground plane based on which points are outside of the 3D bounding box; and
calculating new ground plane coefficients based on remaining ones of the plurality of fixed points, and the method further comprises generating a corrected ground plane estimation based on the new ground plane coefficients.

8. The method of claim 7, wherein the image capturing device comprises a monocular camera.

9. The method of claim 7, wherein the state information of the surrounding vehicle comprises a 3D position of the surrounding vehicle, an orientation of the surrounding vehicle, and a velocity of the surrounding vehicle.

10. The method of claim 9, wherein the 3D position of the surrounding vehicle comprises coordinates of three bottom vertices and a height of the bounding box of the surrounding vehicle.

11. The method of claim 9, wherein the velocity of the surrounding vehicle comprises an absolute velocity that is based on a difference between the velocity of the autonomous vehicle and a relative velocity of the surrounding vehicle.

12. The method of claim 9, wherein the orientation of the surrounding vehicle is based at least on the corrected ground plane estimation.

13. A non-transitory computer-readable storage medium containing executable computer program code for estimating velocity of an autonomous vehicle and state information of a surrounding vehicle, the code comprising instructions configured to cause a processor to:
receive image data from an image capturing device;
perform a ground plane estimation by predicting a depth of points on a road surface based on an estimated pixel-level depth;
determine a three-dimensional (3D) bounding box of the surrounding vehicle;
determine the state information of the surrounding vehicle based on the ground plane estimation and the 3D bounding box; and
determine the velocity of the autonomous vehicle based on an immovable object relative to the autonomous vehicle, wherein an operation of the autonomous vehicle is controlled based on at least one of the state information or the velocity of the autonomous vehicles,
wherein performing the ground plane estimation comprises updating one or more ground plane coefficients based on changes in the road surface in real-time,
wherein updating one or more ground plane coefficients comprises:
selecting a plurality of fixed points in a lower portion of the image data that includes the road surface;
removing one or more points of the plurality of fixed points that are inappropriate for estimating the ground plane based on which points are outside of the 3D bounding box; and
calculating new ground plane coefficients based on remaining ones of the plurality of fixed points, and the code further causes the processor to generate a corrected ground plane estimation based on the new ground plane coefficients.

14. The non-transitory computer-readable storage medium of claim 13, wherein the state information of the surrounding vehicle comprises a 3D position of the surrounding vehicle, an orientation of the surrounding vehicle, and a velocity of the surrounding vehicle.

15. The non-transitory computer-readable storage medium of claim 14, wherein the 3D position of the surrounding vehicle comprises coordinates of three bottom vertices and a height of the bounding box of the surrounding vehicle.

16. The non-transitory computer-readable storage medium of claim 14, wherein the velocity of the surrounding vehicle comprises an absolute velocity that is based on a difference between the velocity of the autonomous vehicle and a relative velocity of the surrounding vehicle.

17. The non-transitory computer-readable storage medium of claim 14, wherein the orientation of the surrounding vehicle is based at least on the corrected ground plane estimation.

* * * * *